B. B. MANN.
CAGES FOR RESTRAINING COWS WHILE BEING MILKED.
No. 190,345. Patented May 1, 1877.
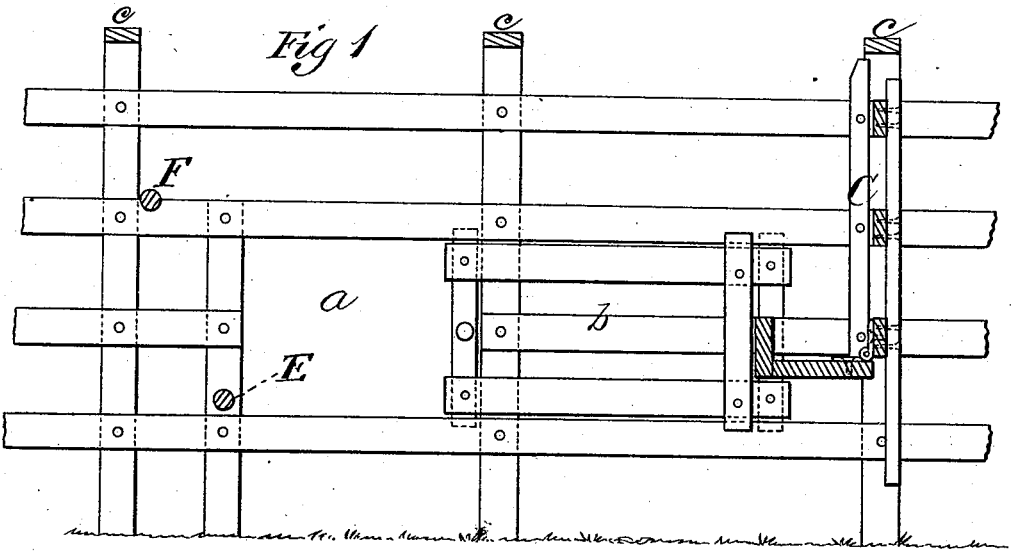
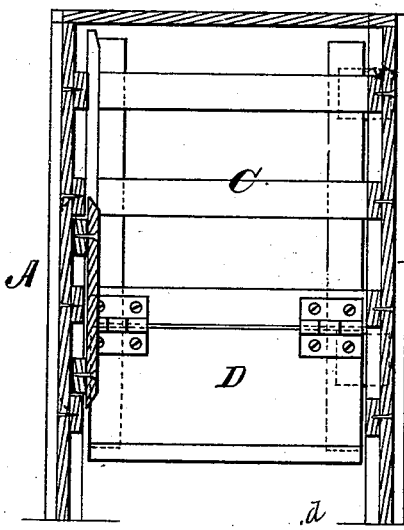
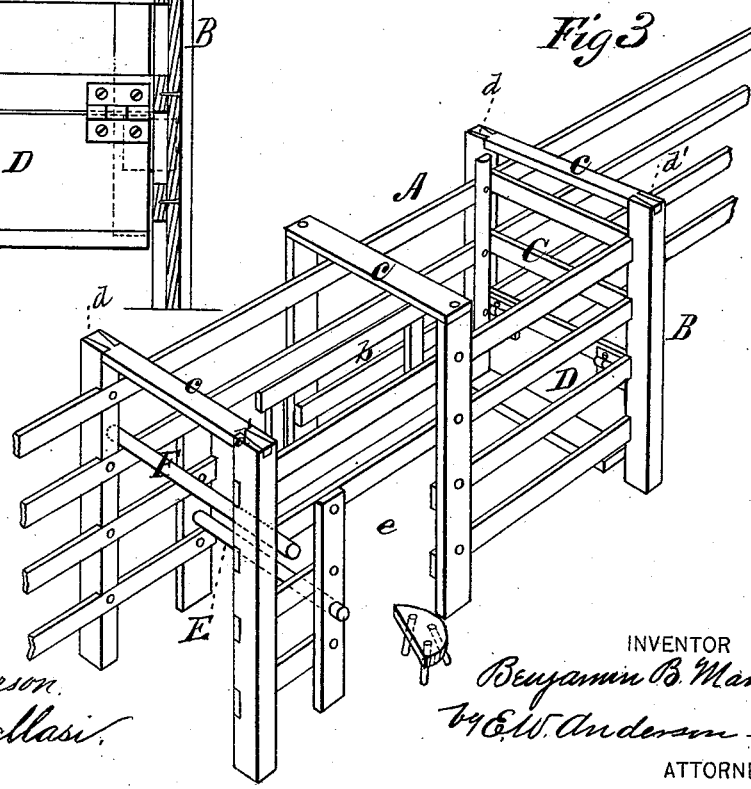
WITNESSES
Villette Anderson
Francis J. Masi
INVENTOR
Benjamin B. Mann,
by E. W. Anderson
ATTORNEY

UNITED STATES PATENT OFFICE.

BENJAMIN B. MANN, OF HIAWATHA, KANSAS.

IMPROVEMENT IN CAGES FOR RESTRAINING COWS WHILE BEING MILKED.

Specification forming part of Letters Patent No. 190,345, dated May 1, 1877; application filed February 17, 1877.

*To all whom it may concern:*

Be it known that I, BENJAMIN B. MANN, of Hiawatha, in the county of Brown and State of Kansas, have invented a new and valuable Improvement in Devices for Milking Cows; and I do hereby declare that the following is a full, clear, and exact description of the construction and operation of the same, reference being had to the annexed drawings, making a part of this specification, and to the letters and figures of reference marked thereon.

This invention has relation to improvements in pens which are designed to receive a cow while being milked, and to prevent her from kicking, whisking her tail, or otherwise interfering with or retarding this operation.

The nature of my invention will be fully understood from the following description.

In the annexed drawings, the letter A designates a main line of fence separating the pasture from the calf-pen, which is provided with an aperture, *a*, closed by a sliding door, *b*, through which, when desired, the calf will have access to the cow for sucking. B represents a section of fencing, which is arranged parallel to the main line upon the pasture side of the same, and at a sufficient distance therefrom to admit the cow between it and the said main frame.

This section is in length slightly greater than that of the cow, and its distance from the main line is such that while the cow can freely enter the space between the latter and former, she will not have room to turn round.

Section B is braced to the fence A by means of transverse boards *c*, having dovetail tenons *d* on their ends, which are received in corresponding mortises *d'*, in the upper ends of the posts of the pen-walls. C represents a gate, which is hinged to the end post of the section B, and closes one end of the pen. This gate is provided with a trough, D, hinged thereto, which, when thrown up in a horizontal position to receive the food, the gate being shut, will lock the gate and prevent the same from being opened.

When trough D is thrown down it will offer no obstacle to opening the gate.

E represents a strong wooden bar, extending across the pen at a suitable distance from the ground, over which a cow, on entering the pen, will be readily able to step, but which will effectually prevent her from kicking.

Cows always kick to the front, and this bar, being just in front of the animal's hind legs, will intercept and arrest this movement, and will correct a vicious habit of this kind, owing to the pain which an indulgence therein would occasion.

By this means all danger of upsetting the milk-pail through kicking is effectually obviated.

F represents a removable bar, which is passed across the pen behind the cow after her entrance into the same.

This bar will effectually prevent the animal from backing out of the pen during milking.

Section B is provided with an opening, *e*, abreast of the bag of the cow, through which the milker will have access to the milk-bag. This opening will be sufficiently large to allow the cow to be conveniently milked, but insufficient to admit of her escape into the pasture.

By means of the door, after the milking is completed, the cow can be admitted to the pasture, and the sliding door allows the calf to be suckled without admitting the dam to the calf-lot. This latter door, when closed, cuts off the cow from the calf, but at the same time, the fence being open, allows the former the companionship of the latter.

What I claim as new, and desire to secure by Letters Patent, is—

1. The combination, with the pen-walls A B, of the hinged end gate C, having a vertically-vibrating trough, D, adapted to lock the gate, substantially as specified.

2. The combination, with the main line of fence A, having aperture *a* and sliding door *b*, of the parallel fence-section B, having milking-opening *e*, and the gate C, having hinged trough D, adapted to be thrown into a horizontal position for locking the gate, substantially as specified.

3. The milking-pen A B C, having an anti-kicking bar, E, a removable anti-backing bar, F, the sucking-aperture *a*, the sliding door *b*, closing the latter, and the milking-aperture *e* on the pasture side of the pen, substantially as specified.

In testimony that I claim the above I have hereunto subscribed my name in the presence of two witnesses.

BENJAMIN B. MANN.

Witnesses:
L. R. CHASE,
I. A. McCAUL.